(12) United States Patent
Sadasivam et al.

(10) Patent No.: US 10,607,137 B2
(45) Date of Patent: Mar. 31, 2020

(54) BRANCH PREDICTOR SELECTION MANAGEMENT

(71) Applicant: International Business Machines Corporation, Armonk, NY (US)

(72) Inventors: Satish Kumar Sadasivam, Erode (IN); Puneeth A. H. Bhat, Bangalore (IN); Shruti Saxena, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 15/479,326

(22) Filed: Apr. 5, 2017

(65) Prior Publication Data

US 2018/0293076 A1 Oct. 11, 2018

(51) Int. Cl.
*G06F 9/38* (2018.01)
*G06N 3/08* (2006.01)
*G06N 3/063* (2006.01)

(52) U.S. Cl.
CPC .............. *G06N 3/08* (2013.01); *G06F 9/3848* (2013.01); *G06N 3/063* (2013.01)

(58) Field of Classification Search
CPC .................................................... G06F 9/3806
See application file for complete search history.

(56) References Cited

U.S. PATENT DOCUMENTS

| | | | |
|---|---|---|---|
| 6,658,558 B1 | 12/2003 | Kahle et al. | |
| 7,673,122 B1 | 3/2010 | Song et al. | |
| 8,954,946 B2 | 2/2015 | Jin et al. | |
| 9,507,598 B1* | 11/2016 | Bonanno | G06F 9/30058 |
| 2010/0332812 A1* | 12/2010 | Burger | G06F 9/3844 |
| | | | 712/239 |
| 2012/0079255 A1 | 3/2012 | Combs et al. | |
| 2014/0201507 A1* | 7/2014 | Jayaseelan | G06F 9/3844 |
| | | | 712/239 |
| 2015/0332170 A1* | 11/2015 | Sharma | G06N 3/063 |
| | | | 706/12 |
| 2016/0283244 A1 | 9/2016 | Jiang et al. | |

FOREIGN PATENT DOCUMENTS

GB 2406413 A 3/2005

OTHER PUBLICATIONS

Yeh et al., "Two-Level Adaptive Training Branch Prediction", Originally published in Proc. 24th Ann. Int'l Symp. Microarchitecture, 1991, 14 pages. Copyright 1991 ACM.

(Continued)

*Primary Examiner* — Michael J Metzger
(74) *Attorney, Agent, or Firm* — Daniel C. Housley

(57) ABSTRACT

Disclosed aspects relate to branch predictor selection management in a pipelined microprocessor architecture. A set of selection factor data may be collected in the pipelined microprocessor architecture. The set of selection factor data may be analyzed using a perceptron-based learning technique with respect to a set of candidate branch predictors. A chosen branch predictor may be selected from the set of candidate branch predictors based on analyzing the set of selection factor data with respect to the set of candidate branch predictors using the perceptron-based learning technique. The chosen branch predictor may be invoked in the pipelined microprocessor architecture.

20 Claims, 9 Drawing Sheets

(56) References Cited

OTHER PUBLICATIONS

Eden et al., "Hybrid Myths in Branch Prediction", University of Michigan, 8 pages. http://web.eecs.umich.edu/~tnm/papers/hybridmyth01.pdf.
Seznec, "A New Case for the TAGE Branch Predictor" ACM, MICRO 2011: The 44th Annual IEEE/ACM International Symposium on Microarchitecture, Dec. 2011, Porto Allegre, Brazil, 12 pages. https://hal.inria.fr/hal-00639193/document.
Jimenez et al., "Dynamic Branch Prediction with Perceptrons", Jan. 2001, Department of Computer Sciences The University of Texas at Austin, 10 pages.

* cited by examiner

BRANCH PREDICTOR SELECTION MANAGEMENT

BACKGROUND

This disclosure relates generally to computer systems and, more particularly, relates to branch predictor selection management in a pipelined microprocessor architecture. The amount of branch instructions used is increasing. As the amount of branch instructions used increases, the need for branch predictor selection management in a pipelined microprocessor architecture may also increase.

SUMMARY

Aspects of the disclosure relate to branch prediction selector techniques. An early deep learning based selection technique may be utilized to select a comparatively accurate branch predictor according to branch behavior and predictor behavior. A neural-network-based perceptron table may be indexed using an instruction address. A global history vector may track history patterns as taken or not taken. The selection of a predictor may be derived using the vector dot product of weights and global history vector bits. The selector may determine the selection based on the perceptron sum.

Disclosed aspects relate to branch predictor selection management in a pipelined microprocessor architecture. A set of selection factor data may be collected in the pipelined microprocessor architecture. The set of selection factor data may be analyzed using a perceptron-based learning technique with respect to a set of candidate branch predictors. A chosen branch predictor may be selected from the set of candidate branch predictors based on analyzing the set of selection factor data with respect to the set of candidate branch predictors using the perceptron-based learning technique. The chosen branch predictor may be invoked in the pipelined microprocessor architecture.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
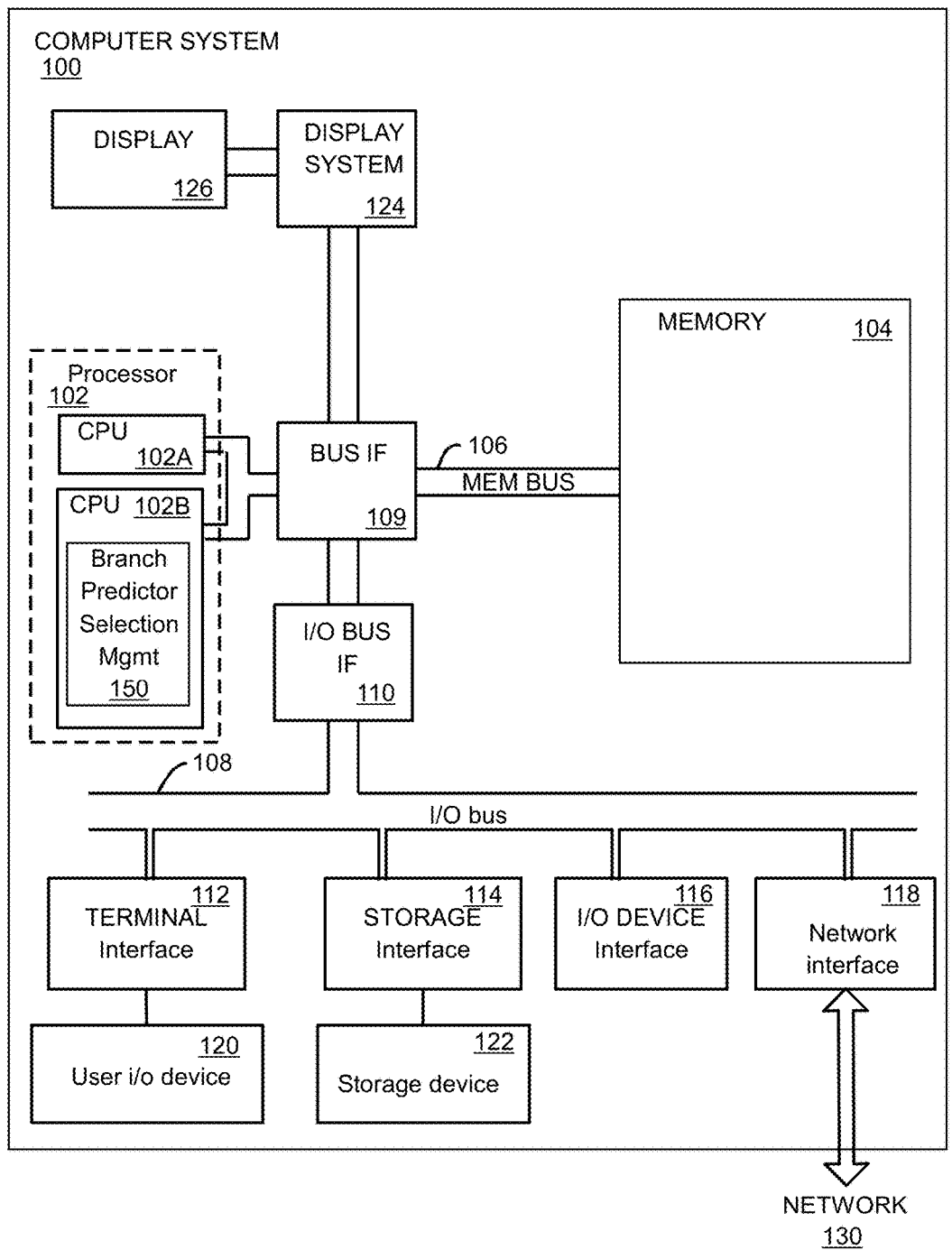
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to branch prediction selector techniques. An early deep learning based selection technique may be utilized to select a comparatively accurate branch predictor according to branch behavior and predictor behavior. A neural-network-based perceptron table may be indexed using an instruction address. A global history vector may track history patterns as taken or not taken. The selection of a predictor may be derived using the vector dot product of weights and global history vector bits. The selector may determine the selection based on the perceptron sum. If the sum is less than 0, a first predictor may be selected. If the sum is greater than 0, a second predictor may be selected.

In computer architecture, a branch predictor is a digital circuit that tries to predict the direction of a conditional branch before the branch is executed and before the outcome is known. Flow in the instruction pipeline may be enhanced using branch prediction. The instruction may continue in the predicted direction and speculatively executed. If a branch was incorrectly predicted, the speculatively executed directions may be discarded and the pipeline may start over with a new path. This may result in a delay in the instruction execution, causing low performance. It may be desired to make accurate predictions with minimal hardware. Using a single branch prediction technique may or may not be an optimal approach to serve the purpose for a wide range of workloads. It may be desired to construct or modify a selector to reduce the reliance on two-bit classical selectors relative to merely only enhancing the branch predictor itself.

Aspects of the disclosure relate to a system, method, and computer program product for branch predictor selection management in a pipelined microprocessor architecture. A set of selection factor data may be collected in the pipelined microprocessor architecture. The set of selection factor data may be analyzed using a perceptron-based learning technique with respect to a set of candidate branch predictors. A chosen branch predictor may be selected from the set of candidate branch predictors based on analyzing the set of selection factor data with respect to the set of candidate branch predictors using the perceptron-based learning technique. The chosen branch predictor may be invoked in the pipelined microprocessor architecture.

A set of historical branch behavior data, or a global history vector, may be collected. The global history vector may represent the behavior of the previous N branches before the current branch. The behavior indicated in the global history vector may be defined as "taken" (1) or "not taken" (−1). The set of historical branch behavior may be utilized to calculate a weighted sum using the perceptron table. Branches that execute in the processor may be mapped to a row in the perceptron table. The weights may be derived from the table using the dot product with the historical branch behavior data. The dot product may be utilized to obtain a weighted sum. As an example, the historical branch behavior data may be 12 bits (e.g., −1, −1, 1, 1, −1, −1, 1, 1, 1, −1, 1, −1). Rows in the perceptron table may have thirteen columns (e.g., 1 bias and 12 weights). The weighted sum may be equivalent to the bias added to the dot product of the historical branch behavior data and the corresponding weights in the perceptron table. The weighted sum (e.g., confidence score) may be positive or negative compared to a threshold of zero. If the value is positive, a first predictor may be chosen. If the value is negative, a second branch predictor may be chosen.

After the selection process, the perceptron table weights may be updated. If the two predictors differ, the perceptron table weights may be updated. If the first branch predictor gives a correct prediction and the second predictor gives an incorrect prediction, the weights may be incremented by +1. If the second branch predictor gives a correct prediction and the first branch predictor gives an incorrect prediction, the weights may be decremented by −1. If both predictors are correct/incorrect, the update to the perceptron table may be bypassed. As an example, if the first predictor was chosen, the predicted direction was correct, and the confidence score is greater than a threshold value, the second branch predictor may not be updated. As another example, if the second predictor was chosen, the predicted direction was correct, and the confidence score is greater than a threshold value, the first branch predictor may not be updated. Altogether, aspects of the disclosure can have performance or efficiency benefits. Aspects may save resources such as bandwidth, disk, processing, or memory. As an example, processing may be saving by improving the selector. A selector with high accuracy may more frequently predict the correct branch, which may result in fewer delays in the instruction execution. Fewer delays may require less processing. Other examples of saving processing using branch predictor selection management may also be possible.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. One of more CPUs can store a branch predictor selection management application 150 (e.g., as firmware). In embodiments, the branch predictor selection management application 150 may include instructions or statements that execute on the processor 102 or instructions or statements that are interpreted by instructions or statements that execute on the processor 102 to carry out the functions as further described below. In certain embodiments, the branch predictor selection management application 150 is implemented in hardware via semiconductor devices, chips, logical gates, circuits, circuit cards, and/or other physical hardware devices in lieu of, or in addition to, a processor-based system. In embodiments, the branch predictor selection management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
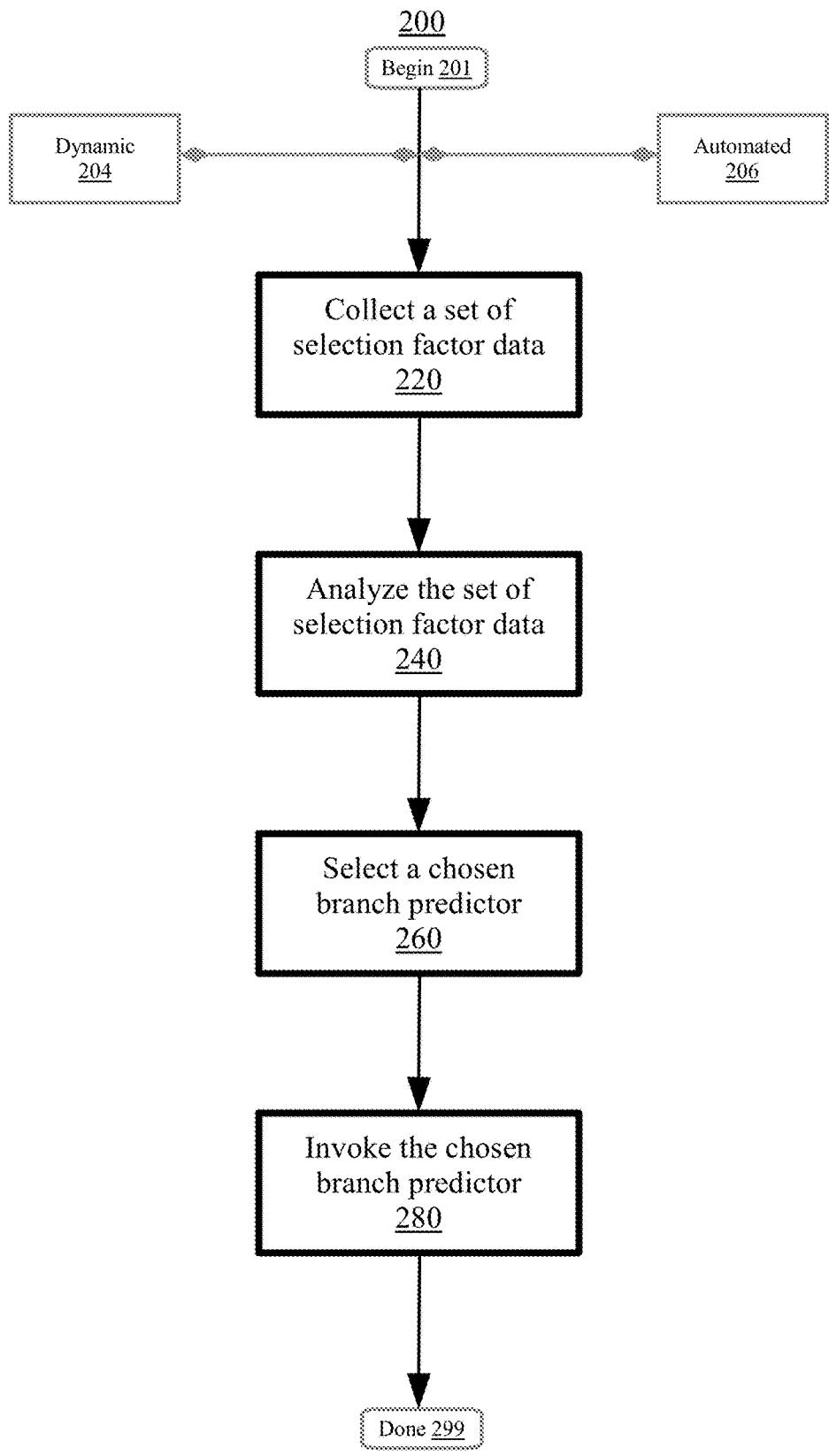
FIG. 2 is a flowchart illustrating a method for branch predictor selection management in a pipelined microprocessor architecture, according to embodiments.

FIG. 2 is a flowchart illustrating a method 200 for branch predictor selection management in a pipelined microprocessor architecture, according to embodiments. A branch may include an instruction in a computer program that may result in the execution of an instruction sequence. A branch predictor may include a digital circuit which predicts the direction in which a branch will go before it is known for sure. The branch predictor may improve or enhance the flow in modern pipelined microprocessor architectures (e.g., x86). A pipelined microprocessor may use branch prediction to collect and execute instructions along a predicted path. The method 200 relates to enhancing or optimizing the selector and investing in branch prediction selector techniques.

There are several types of existing branch prediction techniques which may be included in the set of candidate branch predictors as part of branch predictor selection management. Perceptron branch prediction relates to using a perceptron to learn correlations between particular branch outcomes in the global history and the behavior of the current branch. Partially Tagged Geometric History Length (TAGE) branch prediction may relate to a base predictor in charge of providing a basic prediction and a set of tagged predictor components. The tagged predictor components may be indexed using different global history lengths which form a geometric series. Hybrid branch prediction may relate to combining multiple branch predictors. As an example, one set of branches may be better predicted by a first scheme while a different set of branches may be better predicted by a second scheme. It may be beneficial to combine the first and second schemes in a hybrid predictor and let each set of branches be predicted by the branch prediction scheme which predicts it most accurately. Two-level adaptive prediction may relate to a branch prediction technique based on the history of branches executed during the current execution of the program. Execution history pattern information may be collected on-the-fly of the program execution via updating the pattern history information in the branch history pattern table of the predictor.

Indirect Target Tagged Geometric History Length (IT-TAGE) branch prediction may rely on the same principles as the TAGE predictor. With respect to ITTAGE branch prediction, a prediction may be provided using the tagged predictor component that uses the longest history. If no matching tagged predictor component exists, the default prediction may be used. Bi-model branch prediction relates to using a table of n-bit entries indexed with the least significant bits of the branch addresses. The entries may not be tagged so a particular entry may be mapped to different branch instructions. Local branch prediction may relate to using two tables (a local branch history table and a pattern history table) in order to execute branch prediction. Global branch prediction may relate to using a single shift register updated with recent history of executed branches in order to index into a table of bimodal counters. Alloyed branch prediction may combine local and global prediction principles. Loop branch prediction may relate to a conditional jump in a loop. Other branch prediction techniques may also be utilized as a part of branch predictor selection management. The method 200 may begin at 201.

In embodiments, the collecting, the analyzing, the selecting, the invoking, and the other steps described herein may each be executed in a dynamic fashion at block 204. The steps described herein may be executed in a dynamic fashion to streamline branch predictor selection management. The set of operational steps may occur in real-time, ongoing, or on-the-fly. As an example, one or more of the operational steps described herein may be carried-out in an ongoing basis to facilitate, promote, or enhance branch predictor selection management in a pipelined microprocessor architecture. Other examples may also be possible.

In embodiments, the collecting, the analyzing, the selecting, the invoking, and the other steps described herein may each be executed in an automated fashion at block 206. The steps described herein may be executed in an automated fashion without user intervention. The operational steps may occur in an automated fashion without user intervention or manual action (e.g., using automated computer machinery, fully machine-driven without manual stimuli). The automated operations steps may be performed by a branch predictor selection management engine (e.g., as part of a branch predictor selection management system), a cloud management engine (e.g., as part of a cloud environment), or the like.

At block 220, a set of selection factor data may be collected. Generally, collecting can include capturing, gathering, aggregating, accumulating, acquiring, obtaining, or receiving. The set of selection factor data may include information, parameters, parameter values, values, weights, or statistics which relate to various behaviors, features, or characteristics of branch predictors. The set of selection factor data may be saved/stored in a data structure such as a table, a vector, a matrix, an index, or the like. These characteristics may indicate a level of accuracy, performance, precision, variance, repeatability, or the like for a particular branch prediction technique. As an example, the selection factor data may include branch behavior (e.g., a history vector, a pattern history table), branch predictor accuracy, type of branch (e.g., indirect, immediate, conditional), number of executions, vector length, or the like. The set of selection factor data may be utilized to calculate a weighted sum using the values/weights in the perceptron table. The collecting may be performed using a neural network in the pipelined microprocessor architecture. A neural network may include a computational approach which learns to compute functions using example inputs and outputs. Processing nodes called neurons may connect to one another in a network. Data is processed through input unit neurons and transmitted through the network to output unit neurons. A training algorithm may strengthen or weaken the connections between neurons. As an example, the set of selection factor data (e.g., information regarding a particular prediction method) may be captured by input unit neurons and transmitted to output unit neurons. Other examples of collecting a set of selection factor data may also be possible.

Consider the following example. In order to execution an instruction request, an appropriate/efficient branch may be utilized by selecting a branch prediction technique. A set of selection factor data may be collected related to the instruction sequence. The selection factor data may be extracted from an index and indicate an accuracy level of 56%, a classification as an indirect branch, and a vector length of 25. The selection factor data may be captured by input unit neurons and transmitted to output unit neurons in the neural network. The selection factor data may be analyzed in order to select a branch prediction technique. Other examples of collecting a set of selection factor data may also be possible.

At block 240, the set of selection factor data may be analyzed. Generally, analyzing may include examining, investigating, evaluating, or assessing. Analyzing can include extracting (e.g., creating a derivation), examining (e.g., performing an inspection), scanning (e.g., reviewing a sample), evaluating (e.g., generating an appraisal), dissecting (e.g., scrutinizing an attribute), resolving (e.g., ascertaining an observation/conclusion/answer), parsing (e.g., deciphering a construct), querying (e.g., asking a question), searching (e.g., exploring for a reason/ground/motivation), comparing (e.g., relating an assessment), classifying (e.g., assigning a designation), or categorizing (e.g., organizing by a feature). Data analysis may include a process of inspecting, cleaning, transforming, or modeling the set of selection factor data to discover useful information, suggest conclusions, or support decisions. Data analysis may extract information or patterns from the set of selection factor data and transform or translate it into an understandable structure (e.g., a data report which can be provided/furnished) for further use.

The analyzing may be performed using a perceptron-based learning technique. A perceptron may include a neural network which keeps track of positive and negative correlations between branch outcomes (e.g., in the global history) and the branch being predicted. A perceptron may be utilized to learn correlations (e.g., represented by weights) between particular branch outcomes in the global history and the behavior of the current branch. The perceptron-based learning technique may include a deep learning based neural technique (e.g., utilized to design a selector to choose the appropriate predictor to improve the branch predictor accuracy). The analyzing may be performed with respect to a set of candidate branch predictors. The set of candidate branch predictors may include existing branch prediction approaches which may be considered as techniques of prediction for a current branch. The set of candidate branch predictors may include a perceptron branch predictor, a bi-model branch predictor, a local branch predictor, a global branch predictor, an alloyed branch predictor, a loop predictor, a two-level adaptive predictor, a hybrid branch predictor, a TAGE branch predictor, a perceptron branch predictor, an ITTAGE predictor, or the like. As an example, a strong correlation between a particular candidate branch predictor (e.g., a TAGE branch predictor) and the current branch may be indicated in the global history of the particular candidate branch predictor. When analyzed, it may be determined that the candidate branch predictor (e.g., TAGE) may be successful for the current branch. The weighted sum may be calculated as the sum of the bias and each bit of the historical branch behavior data multiplied by the corresponding weights in the perceptron table.

Consider the following example. In order to execute the instruction request, the set of selection factor data may be analyzed with respect to a set of candidate branch predictors. The set of selection factor data for the instruction sequence indicates an accuracy level of 56%, an indirect branch, and a vector length of 25. The set of selection factor data may be compared to the perceptron branch predictor and the TAGE branch predictor in order to determine a correlation. With respect to similar commands/instruction sequences, the perceptron branch predictor may have an accuracy of −045 and the TAGE branch predictor may have an accuracy of +057. The analysis of the perceptron branch predictor and the TAGE branch predictor as they relate to the instruction sequence may be useful in selecting a chosen branch predictor. Based on the analysis, the TAGE branch predictor may have greater success with respect to the instruction sequence. Other examples of analyzing the set of selection factor data with respect to a set of candidate branch predictors may also be possible.

At block 260, a chosen branch predictor may be selected from the set of candidate branch predictors. Selecting can include choosing, electing, specifying, picking-out, or designating. In embodiments, selecting a chosen branch predictor may include designating the branch predictor or subset of branch predictors associated with efficiency or reliability. Aspects of the disclosure relate to the recognition that, in certain embodiments, multiple branch predictors or groups of branch predictors may have equivalent efficiency or reliability. In such a situation, a set of deterministic criteria may be used to designate the branch predictor. The set of deterministic criteria may include requirements, stipulations, or other factors used to determine a chosen branch predictor. The chosen branch predictor may include the candidate branch predictor of the set of candidate branch predictors which is determined to be most appropriate (e.g., have a strong correlation) with respect to the current branch.

The selecting may be performed based on analyzing (e.g., examining a table, investigating an index, parsing a query) the set of selection factor data with respect to the set of candidate branch predictors (e.g., parameters, values, statistics, information) using the perceptron-based learning technique. The weighted sum may be positive or negative. If the value is positive, the first branch predictor may be chosen. If the value is negative, the second branch predictor may be chosen. The selecting may be performed by the selector. As an example, a first branch predictor may be compared with a second (e.g., or third/fourth/fifth) branch predictor and determined to have a stronger correlation with the current branch. The selector may choose the first branch predictor as an appropriate predictor to improve branch prediction accuracy.

Consider the following example. As described herein, the perceptron branch predictor may have an accuracy of −045 and the TAGE branch predictor may have an accuracy of +057 related to the instruction sequence. Based on this analysis, it may be determined that the TAGE branch prediction technique may have greater success in predicting a branch to execute the instruction sequence. The TAGE branch predictor may be selected as the chosen branch predictor. Other examples of selecting a chosen branch predictor may also be possible.

At block 280, the chosen branch predictor may be invoked. Invoking can include initiating execution, executing, instantiating, carrying-out, launching, summoning, performing, or processing. A processor may invoke branch prediction by fetching a branch instruction which indicates whether a branch will be "taken" or "not taken." If a branch will be taken, the processor may fetch the target instructions. If a branch will not be taken, the processor may fetch the fall-through code. The invoking may be performed in the pipelined microprocessor architecture (e.g., via a hardware-oriented module, via firmware). The invoking may relate to one or more instructions. As an example, when a branch is encountered, the pipelined microprocessor may use the chosen branch predictor to execute an instruction along the predicted path. The instruction may include a command, query, or the like related to a specified operation to be processed or performed by the computing system (e.g., pipelined microprocessor). Other examples may also be possible.

Consider the following example. As described herein, the TAGE branch prediction technique may be selected as the chosen branch predictor. TAGE branch prediction may be invoked in the pipelined microprocessor architecture. The TAGE branch predictor may predict Branch A will process the instruction request. The instruction request may be executed and Branch A may be used to process the request, indicating a correct prediction. The instruction request may be efficiently processed. Without using branch predictor selection, the perceptron branch predictor may have been invoked. The perceptron branch predictor may have predicted Branch D to process the instruction request. The prediction of Branch D may reduce the efficiency and performance in the pipelined microprocessor architecture. Other examples of invoking the chosen branch predictor may also be possible.

Method 200 concludes at 299. Aspects of method 200 can have performance or efficiency benefits. Aspects may save resources such as bandwidth, disk, processing, or memory. As an example, selecting a chosen branch predictor from the set of candidate branch predictors may save processing. The chosen branch predictor may include a prediction method which has a strong correlation with the current branch. The strong correlation may indicate a likelihood of success (e.g., as opposed to other less successful prediction methods) with respect to the current branch. Selecting a branch prediction method which is more likely to be successful may require less processing (e.g., than selecting a prediction method with a weaker correlation/which is less likely to be successful). Other examples of saving processing using branch predictor selection management may also be possible.

Figure 3:
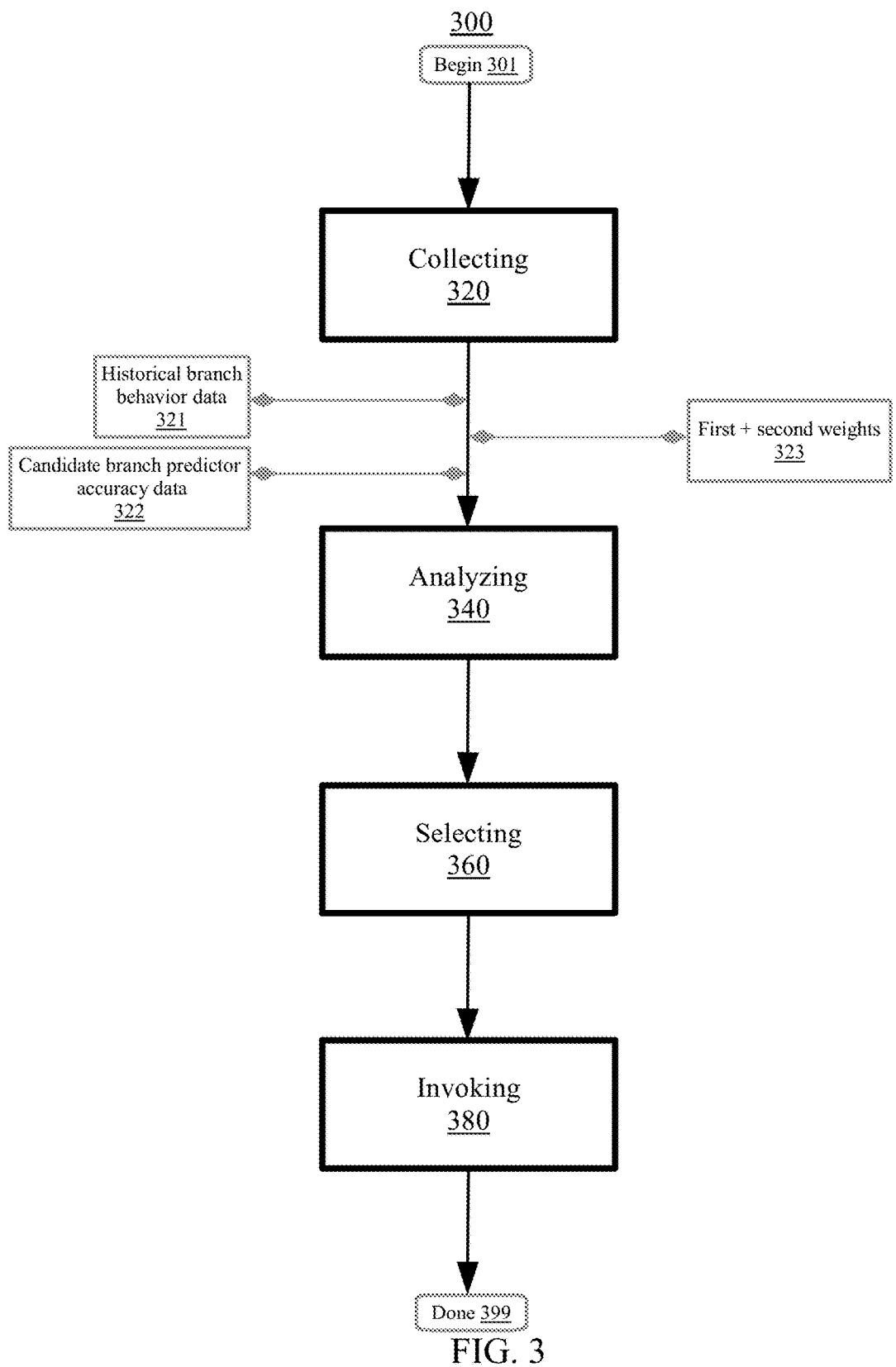
FIG. 3 is a flowchart illustrating a method for branch predictor selection management in a pipelined microprocessor architecture, according to embodiments.

FIG. 3 is a flowchart illustrating a method 300 for branch predictor selection management in a pipelined microprocessor architecture, according to embodiments. Aspects of method 300 may be similar or the same as aspects of method 200, and aspects may be utilized interchangeably. The method 300 may begin at 301. At block 320, a set of selection factor data may be collected. The collecting may be performed using a neural network in the pipelined microprocessor architecture. At block 340, the set of selection factor data may be analyzed. The analyzing may be performed using a perceptron-based learning technique. The analyzing may be performed with respect to a set of candidate branch predictors. At block 360, a chosen branch predictor may be selected from the set of candidate branch predictors. The selecting may be performed based on analyzing the set of selection factor data with respect to the set of candidate branch predictors using the perceptron-based learning technique. At block 380, the chosen branch predictor may be invoked. The invoking may be performed in the pipelined microprocessor architecture.

In embodiments, a set of historical branch behavior data may be collected at block 321. Generally, collecting can include capturing, gathering, aggregating, accumulating, acquiring, obtaining, or receiving. The set of historical branch behavior data may include a type of selection factor data (e.g., information/statistics) related to branch behavior (e.g. history vector). The set of historical branch behavior data may include a global history vector. The global history vector may represent the behavior of the previous N branches before the current branch. The global history vector may track 'N−1' history pattern as +1 (taken) and −1 (not taken) to indicate whether a particular branch was used. The collecting may be performed in the pipelined microprocessor architecture. As an example, branch behavior data may be received by input unit neurons and transmitted through the network to output unit neurons. The set of historical branch behavior data may be analyzed using the perceptron-based learning technique. Generally, analyzing may include examining, investigating, evaluating, or assessing. The perceptron-learning technique may examine or investigate positive and negative correlations between branch outcomes and the current branch. The analyzing may be performed with respect to the set of candidate branch predictors. Correlations between various candidate branch predictors and the current branch may be examined. As an example, the hybrid branch predictor may have predicted Branch A while the perceptron branch predictor may have predicted Branch B. Analyzing may include comparing the two predictors and determining which branch was actually utilized. It may be determined that Branch B was utilized, which may indicate that the perceptron branch predictor was correct. The chosen branch predictor may be selected from the set of candidate branch predictors. Selecting can include choosing, electing, specifying, picking-out, or designating. The selecting may be performed based on analyzing the set of historical branch behavior data with respect to the set of candidate branch predictors using the perceptron-based learning technique. As described herein, a first branch predictor may have been determined as correct as opposed to a second branch predictor which may have been incorrect. The first branch predictor may be selected due to better accuracy of prediction for a particular branch.

In embodiments, a set of historical branch behavior data may be collected at block 322. Generally, collecting can include capturing, gathering, aggregating, accumulating, acquiring, obtaining, or receiving. The number of successes and failures of a branch predictor may be tracked and used to compute/calculate accuracy data with respect to the particular branch predictor. As an example, the two-level adaptive predictor may be tracked and may result in 30 successes and 25 failures. Historical branch behavior data may be composed for the two-level adaptive predictor. The historical branch behavior data may be indicated as a ratio (e.g., 30/55), a percentage (e.g., 55%), a star-rating (e.g., 3 out of 5 stars), or other types of indicators. The collecting may be performed in the pipelined microprocessor architecture. The set of historical branch behavior data may be weighted. The weighting may be performed using a set of appropriate weights for the set of historical branch behavior data. The weighting may be performed for the history bits in the global history vector derived from the perceptron table.

The set of historical branch behavior data may be analyzed using the perceptron-based learning technique. Generally, analyzing may include examining, investigating, evaluating, or assessing. The analyzing may be performed with respect to the set of candidate branch predictors. Historical branch behavior data for various branch predictors may be extracted, parsed, classified, or the like to discover useful information and patterns. As an example, the historical branch behavior data for the two-level adaptive predictor may be indicated at 55% success while the historical branch behavior data for the TAGE branch predictor may be indicated at 78% success. The TAGE branch predictor may be determined as more likely to be successful for the current branch due to the candidate branch predictor historical branch behavior data. The chosen branch predictor may be selected from the set of candidate branch predictors. Selecting can include choosing, electing, specifying, picking-out, or designating. The selecting may be performed using the set of historical branch behavior data (e.g., a weighted sum) with respect to the candidate branch predictors using the perceptron-based learning technique. As described herein, the historical branch behavior data may indicate that the TAGE branch predictor has a higher success rate than the two-level adaptive predictor. The TAGE branch predictor may be selected as an appropriate predictor for the current branch.

In embodiments, a weighted sum of the set of historical branch behavior data may be analyzed at block 323. Analyzing can include examining, investigating, evaluating, or assessing. Generally, weighting can include prioritizing, emphasizing, biasing, accentuating, or assigning greater priority/preference. Weighting can include assigning a value or integer to the historical branch behavior data. As an example, a first branch may take priority over a second branch (e.g., it may be more important to correctly predict the first branch). The first branch may be weighted more heavily than the second branch (e.g., first branch weighted +3 and second branch weighted +1). The chosen branch predictor may be selected from the set of candidate branch predictors using the perceptron-based learning technique. Selecting can include choosing, electing, specifying, picking-out, or designating. The selecting may be performed using the weighted sum and based on analyzing the set of historical branch behavior data with respect to the set of candidate branch predictors. The branch behavior data may be utilized to update a neural selector table. As an example, a table which is part of the neural network may indicate a selection of the perceptron branch predictor. The selector may utilize the table to make appropriate predictions with respect to predictor selection.

Method 300 concludes at 399. Aspects of method 300 can have performance or efficiency benefits. Aspects may save resources such as bandwidth, disk, processing, or memory. As an example, assigning weights to the historical branch behavior data. The weights may indicate to the selector which branch predictor is appropriate/successful. The selector may utilize the weights to choose a branch predictor, which may require less memory (e.g., as opposed to un-weighted data). Other examples of saving memory may also be possible.

Figure 4:
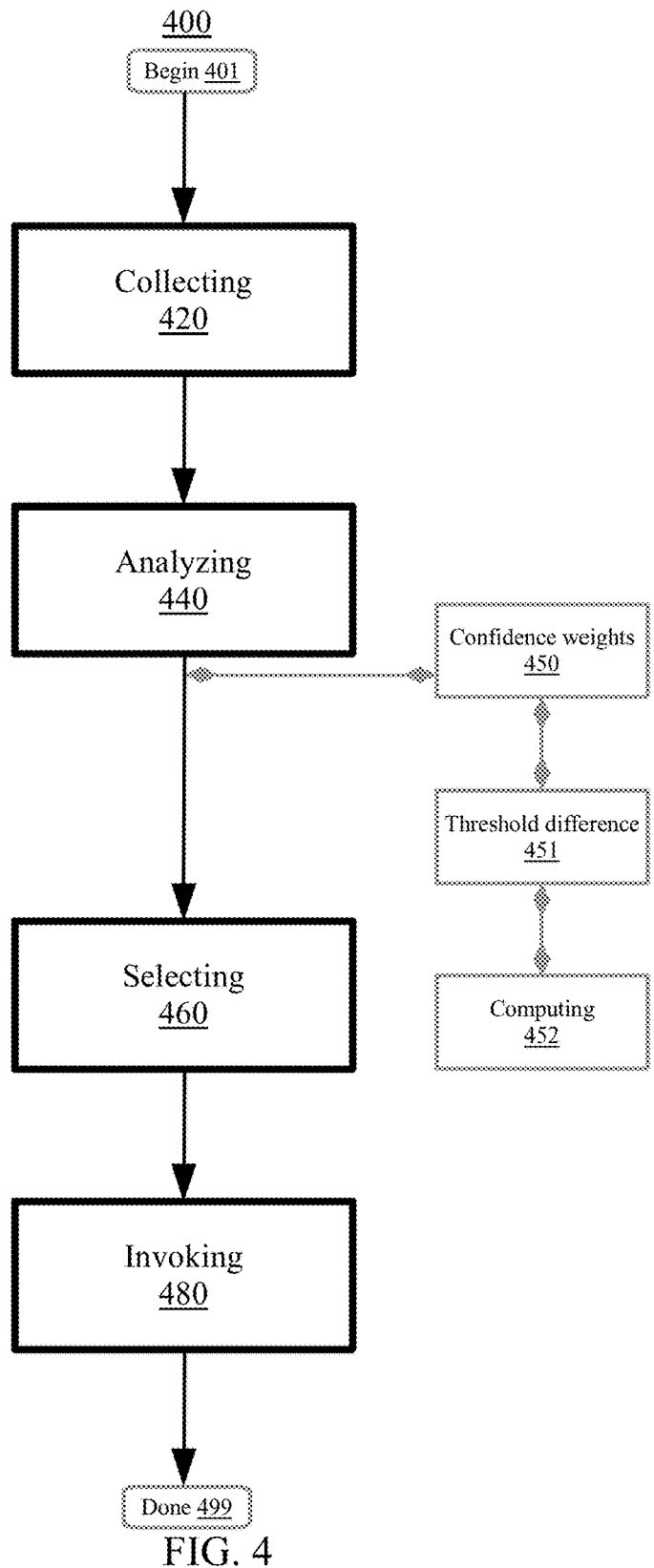
FIG. 4 is a flowchart illustrating a method for branch predictor selection management in a pipelined microprocessor architecture, according to embodiments.

FIG. 4 is a flowchart illustrating a method 400 for branch predictor selection management in a pipelined microprocessor architecture, according to embodiments. Aspects of method 400 may be similar or the same as aspects of method 200/300, and aspects may be utilized interchangeably. The method 400 may begin at 401. At block 420, a set of selection factor data may be collected. The collecting may be performed using a neural network in the pipelined microprocessor architecture. At block 440, the set of selection factor data may be analyzed. The analyzing may be performed using a perceptron-based learning technique. The analyzing may be performed with respect to a set of candidate branch predictors. At block 460, a chosen branch predictor may be selected from the set of candidate branch predictors. The selecting may be performed based on analyzing the set of selection factor data with respect to the set of candidate branch predictors using the perceptron-based learning technique. At block 480, the chosen branch predictor may be invoked. The invoking may be performed in the pipelined microprocessor architecture.

In embodiments, a confidence may be ascertained at block 450. Ascertaining can include determining, computing, resolving, calculating, or establishing. The confidence may include a quantitative measure, representation, or indication of the reliability, dependability, validity, or expected/predicted accuracy of the candidate branch predictors. The confidence may be predetermined (e.g., user-defined) or learned (e.g., based on successes/mispredictions). The ascertaining may be derived from a set of historical branch behavior data (e.g., a weighted sum) and performed with respect to the set of candidate branch predictors. The candidate branch predictors may be analyzed and confidence may be determined as appropriate for an individual predictor.

In embodiments, the set of confidence weights may be computed at block 452. Generally, computing can include determining, resolving, ascertaining, evaluating, or calculating. The computing may be performed with respect to the set of candidate branch predictors. As described herein, the confidence weights may indicate a predicted success of a candidate branch predictor. The computing may be performed based on a set of candidate branch predictor accuracy data. The set of confidence weights may be machine-learned (e.g., without user intervention). As an example, the TAGE branch predictor may have a set of candidate branch predictor accuracy data which indicates a 77% success rate. A confidence weight of +077 may be assigned to the TAGE branch predictor. The branch predictor selection management engine may calculate the confidence weight based on profile data of the TAGE predictor (e.g., historical data, accuracy data). The confidence weight may be updated dynamically (e.g., in real-time). As an example, if the TAGE branch predictor fails, the confidence weight may be updated to equal +074. Other examples may also be possible.

Method 400 concludes at 499. Aspects of method 400 can have performance or efficiency benefits. Aspects may save resources such as bandwidth, disk, processing, or memory. As an example, computing the set of confidence weights using a machine-learning technique may save processing. The branch predictor selection management engine may automatically and dynamically compute or calculate confidence weights for candidate branch predictors without manual intervention. This may prevent a user from calculating confidence weights for the candidate branch predictors, which may require additional processing than automatically computing the weights. Other examples of saving processing may also be possible.

Figure 5:
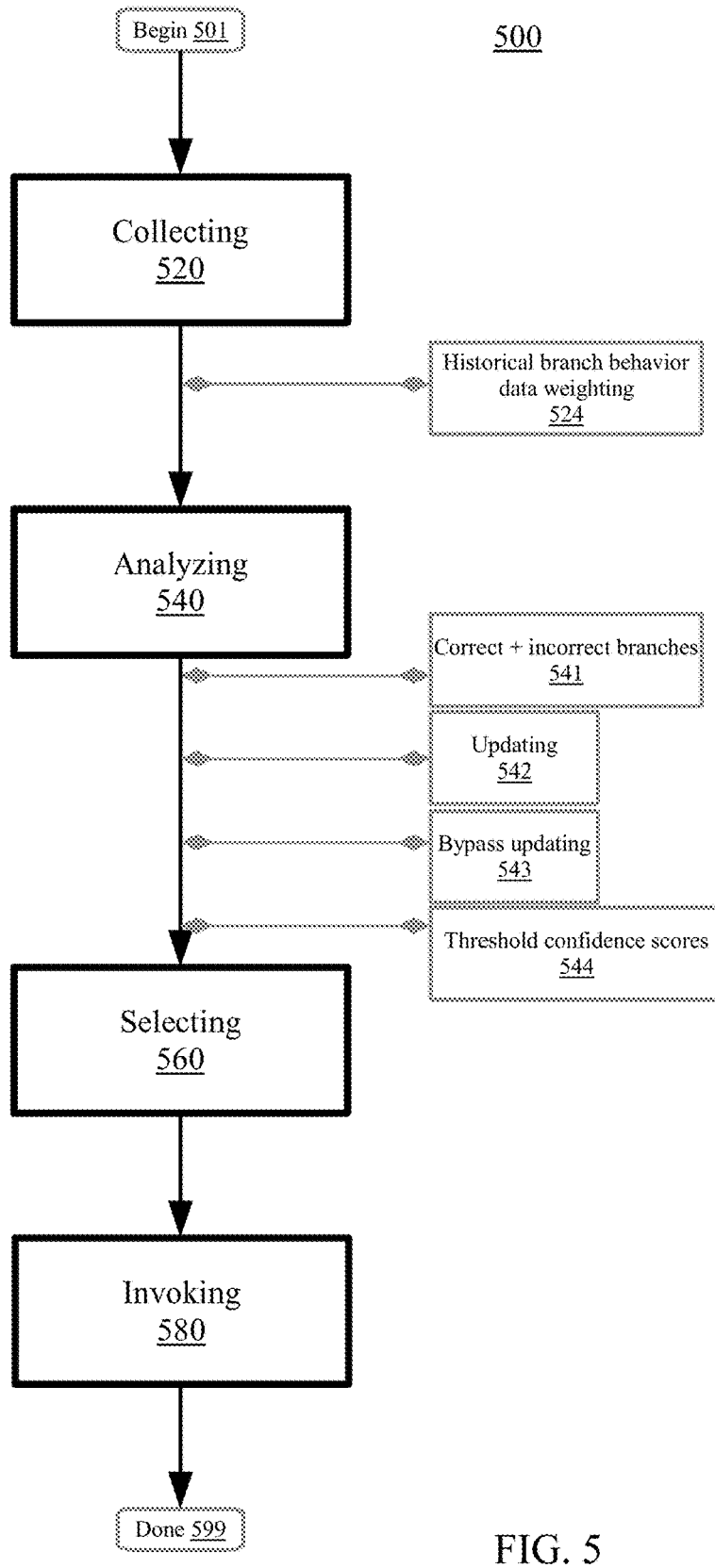
FIG. 5 is a flowchart illustrating a method for branch predictor selection management in a pipelined microprocessor architecture, according to embodiments.

FIG. 5 is a flowchart illustrating a method 500 for branch predictor selection management in a pipelined microprocessor architecture, according to embodiments. Aspects of method 500 may be similar or the same as aspects of method 200/300/400, and aspects may be utilized interchangeably. The method 500 may begin at 501. At block 520, a set of selection factor data may be collected. The collecting may be performed using a neural network in the pipelined microprocessor architecture. At block 540, the set of selection factor data may be analyzed. The analyzing may be performed using a perceptron-based learning technique. The analyzing may be performed with respect to a set of candidate branch predictors. At block 560, a chosen branch predictor may be selected from the set of candidate branch predictors. The selecting may be performed based on analyzing the set of selection factor data with respect to the set of candidate branch predictors using the perceptron-based learning technique. At block 580, the chosen branch predictor may be invoked. The invoking may be performed in the pipelined microprocessor architecture.

In embodiments, a set of historical branch behavior data may be collected at block 524. Generally, collecting can include capturing, gathering, aggregating, accumulating, acquiring, obtaining, or receiving. The collecting may be performed in the pipelined microprocessor architecture. The global history vector may track 'N−1' history pattern as +1 (taken) and −1 (not taken) as described herein. The historical branch behavior data may be arranged in a neural-network-based one-layer perceptron table containing 'M' rows indexed with Instruction Address. A set of confidence weights may be ascertained. Ascertaining can include formulating, computing, resolving, determining, calculating, or establishing. The ascertaining may be performed with respect to the set of candidate branch predictors as described herein. The 'N' confidence weights may be included in the neural-network-based one-layer perceptron table. The set of historical branch behavior data may be analyzed. Generally, analyzing may include examining, investigating, evaluating, or assessing. The analyzing may be performed with respect to the set of candidate branch predictors. The analyzing may be performed using the perceptron-based learning technique. Analyzing may include utilizing the table to determine the vector dot product of the weights and the Global History Vector bits to indicate a summation. The chosen branch predictor may be selected from the set of candidate branch predictors using the perceptron-based learning technique. Selecting can include choosing, electing, specifying, picking-out, or designating. The selecting may be performed using the set of confidence weights with respect to the set of candidate branch predictors and based on analyzing the set of historical branch behavior data with respect to the set of candidate branch predictors. The selection may be based on the perceptron sum described herein, which is derived from the vector dot product of the weights and the Global History Vector bits. If the sum is less than 0, the first candidate branch predictor may be selected. Otherwise, the second candidate branch predictor may be selected.

Consider the following example. An instruction sequence may be prepared in a pipelined microprocessor architecture. A set of historical branch behavior data may be collected for the instruction sequence. As an example, a perceptron table may be created with M rows, indexed with an Instruction Address related to the sequence. The Global History Vector may track a history pattern for the hybrid branch predictor (e.g., +1 taken). A set of confidence weights (e.g., N weights) may be ascertained with respect to the set of candidate branch predictors. For this particular instruction sequence, the hybrid branch predictor may have a confidence weight of +035. The vector dot product of the weights and Global History Vector bits may be calculated. The perceptron sum may decide the selection. The perceptron sum may be greater than 0 (e.g., positive). The hybrid branch predictor may be selected as the chosen branch predictor to execute the instruction sequence. As another example, the perceptron sum for the hybrid branch predictor may be less than 0 (e.g., negative). The hybrid branch predictor may not be selected as the chosen branch predictor. Another predictor, such as the two-level adaptive branch predictor, may be selected to execute the instruction sequence. Other examples of weighting historical branch behavior data may also be possible.

In embodiments, it may be detected that a first candidate branch predictor of the set of candidate branch predictors indicates a first direction of a branch at block 541. Generally, detecting can include sensing, recognizing, identifying, discovering, or ascertaining. As an example, the first candidate branch predictor may be analyzed and it may be ascertained that a first direction of a branch is indicated. It may be detected that a second candidate branch predictor of the set of candidate branch predictors indicates a second direction of the branch. The second candidate branch predictor may be analyzed and it may be ascertained that a second direction of the branch is indicated. The second direction of the branch may differ from the first direction of a branch (e.g., not identical branches). It may be determined that the first branch predictor is indicated to be correct and that the second branch predictor is indicated to be incorrect. Determining can include resolving, ascertaining, identifying, or establishing. For instance, the first and second branches may be analyzed or inspected to discover useful information or suggest conclusions (e.g., first branch is correct/second branch is incorrect). A correct branch predictor may include a correct prediction while an incorrect branch predictor may include a misprediction. As an example, the perceptron branch predictor may predict the second branch while the ITTAGE predictor may predict the first branch. In this example, the first branch may be the correct branch. The ITTAGE predictor may be the branch which correctly predicted the branch. The set of selection factor data may be updated. Updating can include revising the selector such that the selector learns to determine the more accurate predictors. The updating may be performed based on determining that the first direction is indicated to be correct and that the second direction is indicated to be incorrect. The selector may be updated or trained based on two predictors differing. In the example described herein, the selector may be updated to indicate that the ITTAGE predictor was correct while the perceptron branch predictor was incorrect. The selector may be trained according to the rule Wi←Wi+β*Xi, where β is +1/−1 based on which predictor is correct. In embodiments, the selector may not be updated when each of the predictors agree (e.g., identically agree, agree within a threshold). As an example, a first predictor may have been chosen. If the predicted direction is correct and the confidence score/absolute weighted sum is greater than the threshold value, the confidence for the first predictor is high. The second branch predictor may not be updated.

Consider the following example. Branches may need to be predicted and utilized. An instruction request may be executed. In order to process the request, the ITTAGE branch prediction technique may predict branch A while the bi-model prediction technique may predict branch F, where branch A and branch F are two different branches. The instruction may be speculatively run, and branch A may be the correct branch (e.g., branch F is incorrect). The set of selection factor data may be updated based on these results. As an example, the ITTAGE branch prediction technique may be labeled with +1 to indicate that branch A was taken/correct while the bi-model branch prediction technique may be labeled with a −1 to indicate that branch F was not taken/incorrect. These labels may be indicated in an updated set of selection factor data. Similar future execution requests may be more likely to be processed using ITTAGE branch prediction than bi-model branch prediction, since the ITTAGE branch predictor was more accurate in this example. When a similar instruction request is executed, the ITTAGE branch predictor may be utilized to predict a branch for this instruction request. Other examples of identifying correct and incorrect branches to update the set of selection factor data may also be possible.

In embodiments, a set of confidence scores may be ascertained at block 542. Ascertaining can include formulating, computing, resolving, determining, evaluating, calculating, or establishing. The ascertaining may be performed with respect to the set of candidate branch predictors. The ascertaining may be performed based on both invoking the chosen branch predictor in the pipelined microprocessor architecture and analyzing the set of selection factor data (e.g., absolute weighted sum) with respect to the set of candidate branch predictors using the perceptron-based learning technique (e.g., based on a result of the invoking). As an example, if the predictor was correct in predicting/choosing a branch, the predictor may have a higher confidence score. If the predictor was incorrect in predicting/choosing a branch, the predictor may have lower confidence score. It may be determined to update a subset of the set of candidate branch predictors. Generally, determining can include resolving, ascertaining, identifying, or establishing. The determining may be performed based on the set of absolute confidence scores (e.g., the set of weighted sums of the history branch behavior data) in comparison with a threshold value with respect to the set of candidate branch predictors. A subset of the set of candidate branch predictors may include a set or portion of the group of candidate branch predictors. As an example, the determining to update may be based on a threshold difference between confidence scores (as described herein), a comparison of an average score (e.g., the average predictor has a confidence score of 060), exceeding a threshold, or other factors. The subset of the set of candidate branch predictors may be updated. At least a portion of the set of candidate branch predictors may be updated. The predictor update may be based on or impacted by the selection confidence score. As an example, the selector may have chosen the TAGE branch predictor. The TAGE branch predictor may have been correct and the sum of the weights (as described herein) may be greater than a threshold, then other predictors (e.g., not selected predictors) may not be updated.

In embodiments, an absolute weighted sum of the set of selection factor data may be analyzed. The absolute weighted sum (e.g., confidence score) may be positive or negative with a threshold of zero. If the value is positive, the first branch predictor may be chosen. If the value is negative, the second branch predictor may be chosen. The prediction from the branch predictor table may be chosen as the overall prediction to predict the branch direct.

Consider the following example. A local branch predictor may be utilized to process an instruction request. The local branch predictor may predict Branch 30. The instruction request may be speculatively run and Branch 24 may be selected (e.g., Branch 30 fails). A confidence score for the local branch predictor may be ascertained. Due to failure, the local branch predictor may be assigned with a −1 (not taken). The confidence score may exceed a threshold (e.g., of 020) from 0. Based on this confidence score, it may be determined to update a subset of the set of candidate branch predictors (e.g., the local branch predictor). The local branch predictor may be updated. When an instruction request is executed, a global branch predictor may be utilized instead due to a low confidence score for the local branch predictor. The global branch predictor may more accurately predict the branch for the instruction request. Other examples of updating the subset of the set of candidate branch predictors may also be possible.

In embodiments, a set of confidence scores may be ascertained at block 543. Ascertaining can include formulating, computing, resolving, determining, evaluating, calculating, or establishing. The ascertaining may be performed with respect to the set of candidate branch predictors. The ascertaining may be performed based on both invoking the chosen branch predictor in the pipelined microprocessor architecture and analyzing the set of selection factor data with respect to the set of candidate branch predictors using the perceptron-based learning technique as described herein. It may be determined not to update a subset of the set of candidate branch predictors. Generally, determining can include resolving, ascertaining, identifying, or establishing. The determining may be performed based on the set of confidence scores (e.g., the set of weighted sums of the history branch behavior data) with respect to the set of candidate branch predictors. Updating the subset of the set of candidate branch predictors may be bypassed. The update of at least a portion of the branch predictors may be disregarded or prevented. As an example, the selector may have chosen the perceptron branch predictor. The perceptron branch predictor may have been incorrect and the confidence score may not be greater than a threshold. The other candidate predictors may not be updated (e.g., bypassed update).

Consider the following example. An alloyed branch predictor may be utilized to process a specific instruction request. The alloyed branch predictor may predict Branch S. The request may be speculatively run and Branch S may be selected (e.g., Branch S was a correct prediction). A confidence score for the alloyed branch predictor may be ascertained. Due to success, the alloyed branch predictor may be assigned with a +1 (taken). The confidence score may achieve a threshold (e.g., confidence score is greater than a threshold of 075). Based on this confidence score, it may be determined to bypass updating a subset of the set of candidate branch predictors (e.g., the alloyed branch predictor). The alloyed branch predictor may not be updated. When an instruction request is executed, an alloyed branch predictor may be utilized due to a high confidence score. The alloyed branch predictor may accurately predict the branch for the instruction request. Other examples of bypassing an update to the subset of the set of candidate branch predictors may also be possible.

In embodiments, it may be determined whether to update a subset of the set of candidate branch predictors at block 544. Determining may include resolving, ascertaining, identifying, or establishing. The determining may be performed by comparing a threshold score with respect to a set of confidence scores. The threshold confidence score may be a predetermined or machine-learned benchmark or average confidence score. The threshold-based confidence management control may conditionally update the branch predictors based on achievement or lack of achievement of a threshold confidence score. As an example, the perceptron table weights may be desired to be updated. Updating of the perceptron table weights may be performed when both predictors differ. If a first branch predictor gives a correct prediction and the second predictor gives a wrong prediction, then the weights may be incremented by +1. If the second branch predictor gives a correct prediction and the first predictor gives an incorrect prediction, then the weights may be decremented by −1. If both predictors have correct/incorrect predictions, no update may be performed (e.g., to the perceptron table). As another example, if a confidence score exceeds the threshold confidence score, updating may be performed. If the confidence score does not exceed the threshold confidence score, updating may be bypassed.

Consider the following example. A perceptron branch selection technique may be utilized to process an instruction request. The perceptron branch selection technique may predict Branch 39, which may be the correct branch. The perceptron branch predictor may be assigned a confidence score of +070. The confidence score may be compared with a threshold confidence score in order to determine whether or not a subset of the set of candidate branch predictors should be updated. As an example, a threshold confidence score may be equal to +067. Since the confidence score is greater than the threshold, the perceptron branch predictor may be determined as an accurate predictor for the instruction request. The perceptron branch predictor may not be updated. As another example, a threshold confidence score may be equal to +080. Since the confidence score does not achieve or exceed the threshold, the perceptron branch predictor may be still be chosen as a predictor since the value is positive for the branch instruction request. The perceptron branch predictor and the non-chosen predictor may also be updated. Other examples of determining whether to update a subset of the set of candidate branch predictors may also be possible.

Method 500 concludes at 599. Aspects of method 500 can have performance or efficiency benefits. Aspects may save resources such as bandwidth, disk, processing, or memory. As an example, dynamically (e.g., in real-time) updating the branch predictors based on confidence scores may save processing. The ongoing updates to the branch predictors may result in the branch predictors being more accurate and may use less processing than updating the branch predictors only at specified times. Other examples of saving processing may also be possible.

Figure 6:
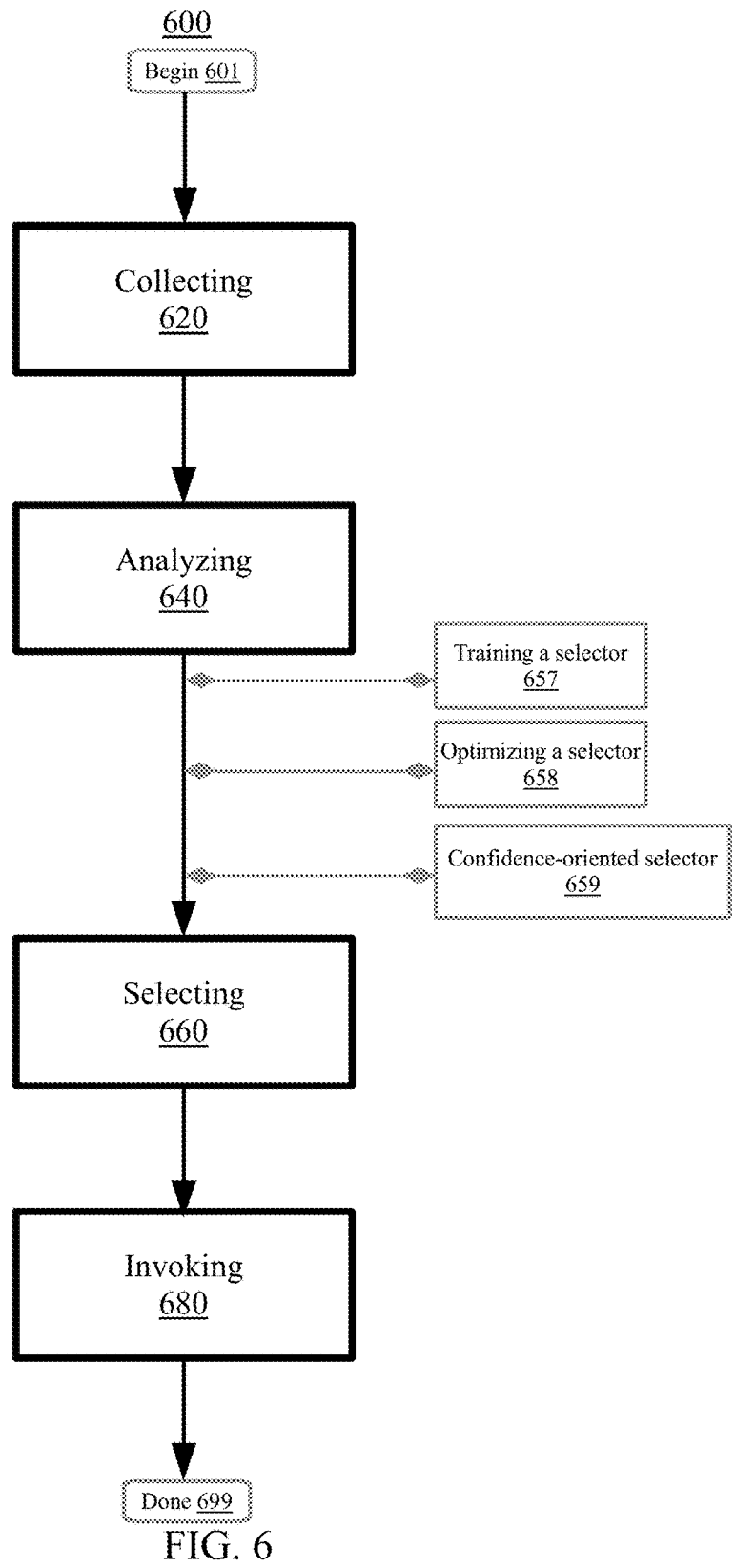
FIG. 6 is a flowchart illustrating a method for branch predictor selection management in a pipelined microprocessor architecture, according to embodiments.

FIG. 6 is a flowchart illustrating a method 600 for branch predictor selection management in a pipelined microprocessor architecture, according to embodiments. Aspects of method 600 may be similar or the same as aspects of method 200/300/400/500, and aspects may be utilized interchangeably. The method 600 may begin at 601. At block 620, a set of selection factor data may be collected. The collecting may be performed using a neural network in the pipelined microprocessor architecture. At block 640, the set of selection factor data may be analyzed. The analyzing may be performed using a perceptron-based learning technique. The analyzing may be performed with respect to a set of candidate branch predictors. At block 660, a chosen branch predictor may be selected from the set of candidate branch predictors. The selecting may be performed based on analyzing the set of selection factor data with respect to the set of candidate branch predictors using the perceptron-based learning technique. At block 680, the chosen branch predictor may be invoked. The invoking may be performed in the pipelined microprocessor architecture.

In embodiments, a selector may be trained at block 657. Training may include using a machine-learning technique to optimize the selector. The selector may be provided with the ability to learn, detect patterns, and make changes or predictions (e.g., without being programmed to do so, without manual action). The training may be performed using the neural network (e.g., a machine-learning technique) in the pipelined microprocessor architecture. As an example, the perceptron branch predictor may have frequent success in predicting branches in a particular environment. The perceptron branch predictor may be successful four out of every five predictions. The selector may recognize this pattern and select the perceptron branch predictor four consecutive predictions and select another predictor the fifth prediction. Other examples may also be possible.

In embodiments, a selector may be optimized at block 658. Optimizing can include correcting, developing, enhancing, improving, upgrading, or revising. The selector may optimized based on a machine-learning technique. The selector may recognize patterns in order to make accurate predictions with respect to branch predictors. The optimizing may be performed to choose an appropriate branch predictor. The selector may be optimized in order to accurately and frequently select a branch predictor which results in a correct prediction. As an example, the selector may select a correct predictor 7 out of 10 predictions. The selector may utilize patterns in order to more accurately (e.g., 8 out of 10 predictions) select a predictor. Other examples may also be possible.

In embodiments, the chosen branch predictor may be identified at block 659. Identifying can include recognizing, discovering, distinguishing, or detecting. The identifying may be performed using a confidence-oriented selector (e.g., based on the confidence scores). As described herein, the computed confidence scores may result in a more accurate selection of a correct branch predictor. A predictor with a higher confidence score may be more likely to correctly predict the branch than a predictor with a lower confidence score. As an example, the ITTAGE branch predictor may have a confidence score of 4 out of 10 while the two-level adaptive predictor may have a confidence score of 7 out of 10. The two-level adaptive predictor may be identified as the chosen branch selector based on a higher confidence score than the ITTAGE branch predictor. Other examples may also be possible.

Method 600 concludes at 699. Aspects of method 600 can have performance or efficiency benefits. Aspects may save resources such as bandwidth, disk, processing, or memory. As an example, processing may be saved by training the selector using the neural network. Training the selector may result in more accurate branch predictions using a machine-learning technique. A selector which more accurately predicts the branch predictor may require less processing than an un-trained selector. Other examples of saving processing may also be possible.

Figure 7:
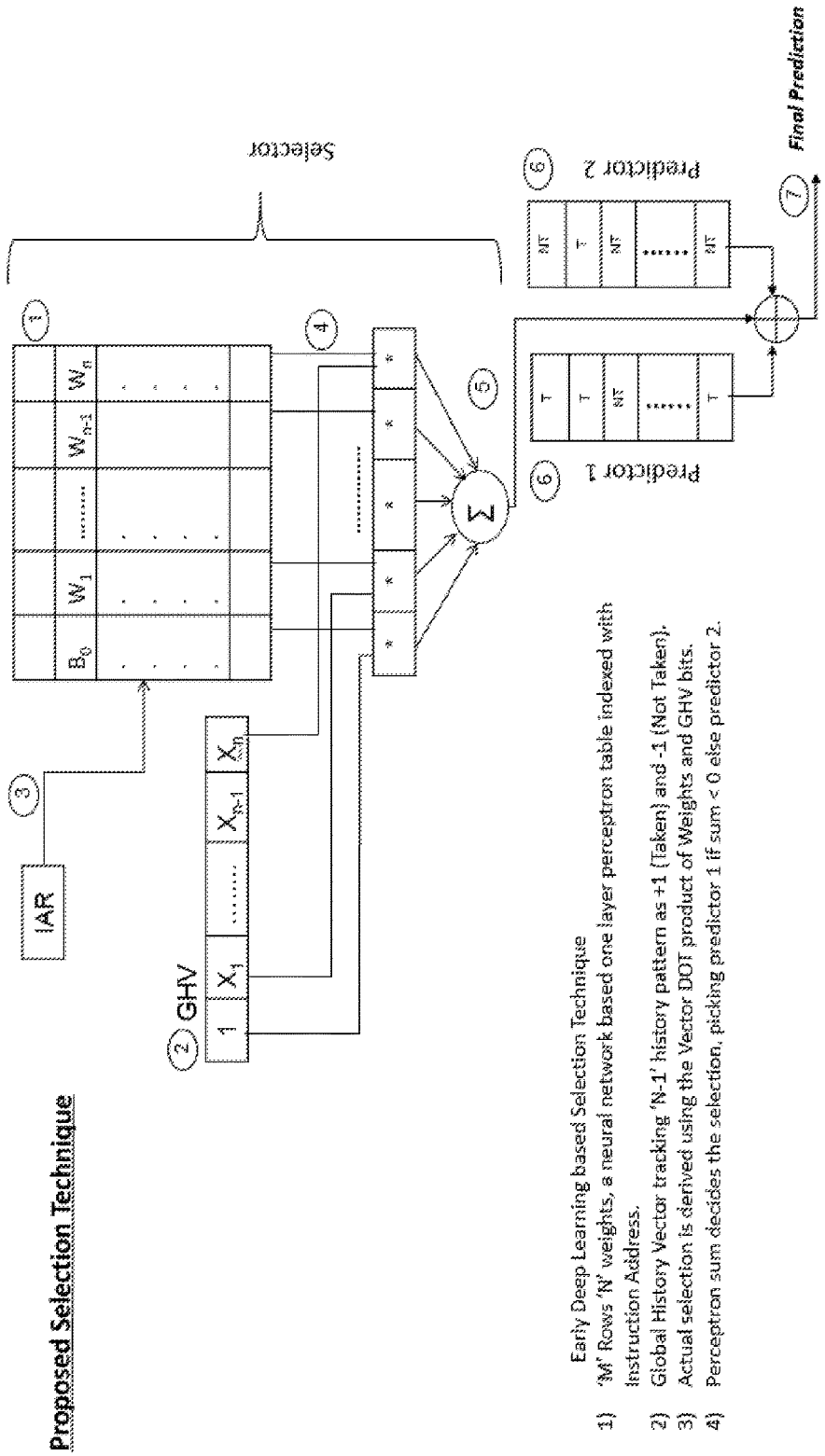
FIG. 7 illustrates an example of branch predictor selection management in a pipelined microprocessor architecture, according to embodiments.

FIG. 7 illustrates an example system 700 of branch predictor selection management in a pipelined microprocessor architecture, according to embodiments. The example system 700 may relate to an early deep learning based selection technique for branch predictor selection management. Aspects relate to forming a neural network based one-layer perceptron table indexed with an Instruction Address. The table may consist of M rows and N weights. The Global History Vector may track 'N−1' history patterns as +1 (taken) or −1 (not taken). The vector dot product of the weights and Global History Vector bits may be calculated. The perceptron sum may determine the selection of a predictor. If the perceptron sum is less than 0, a first predictor may be chosen. If the perceptron sum is greater than 0, a second predictor may be chosen.

Figure 8:
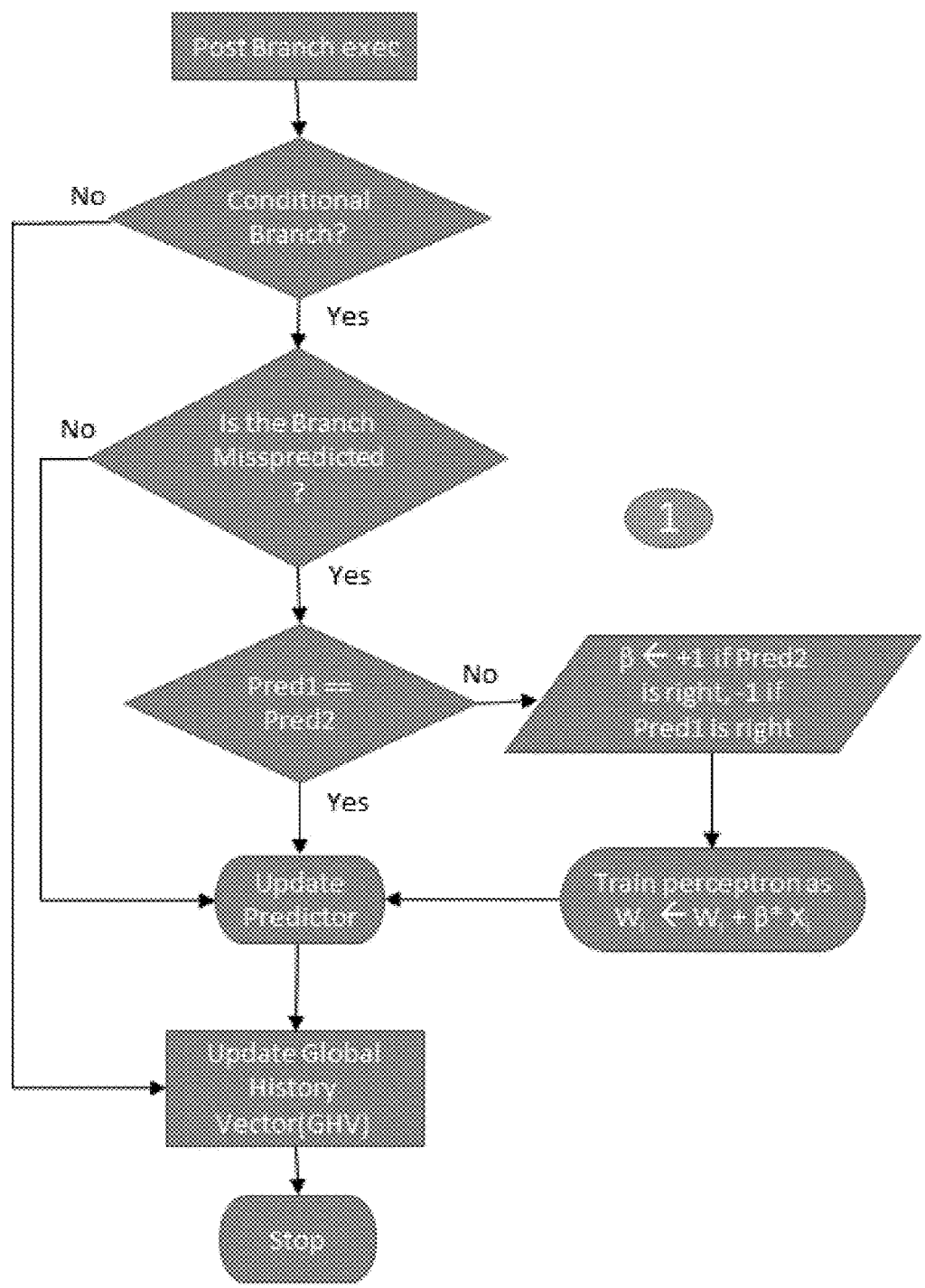
FIG. 8 illustrates an example of branch predictor selection management in a pipelined microprocessor architecture, according to embodiments.

FIG. 8 illustrates an example system 800 of branch predictor selection management in a pipelined microprocessor architecture, according to embodiments. The example system 800 may relate to updating the selector. If the branch is not a conditional branch, the Global History Vector may be updated. If the branch is conditional but not mispredicted, the predictor may be updated. If the branch is conditional and mispredicted and the first and second predictors are equal, the predictor may be updated. If the branch is conditional and mispredicted but the first and second predictors are unequal, the predictors may be assigned values of +1 (taken) or −1 (not taken). The perceptron may be trained and the predictor may be updated.

Figure 9:
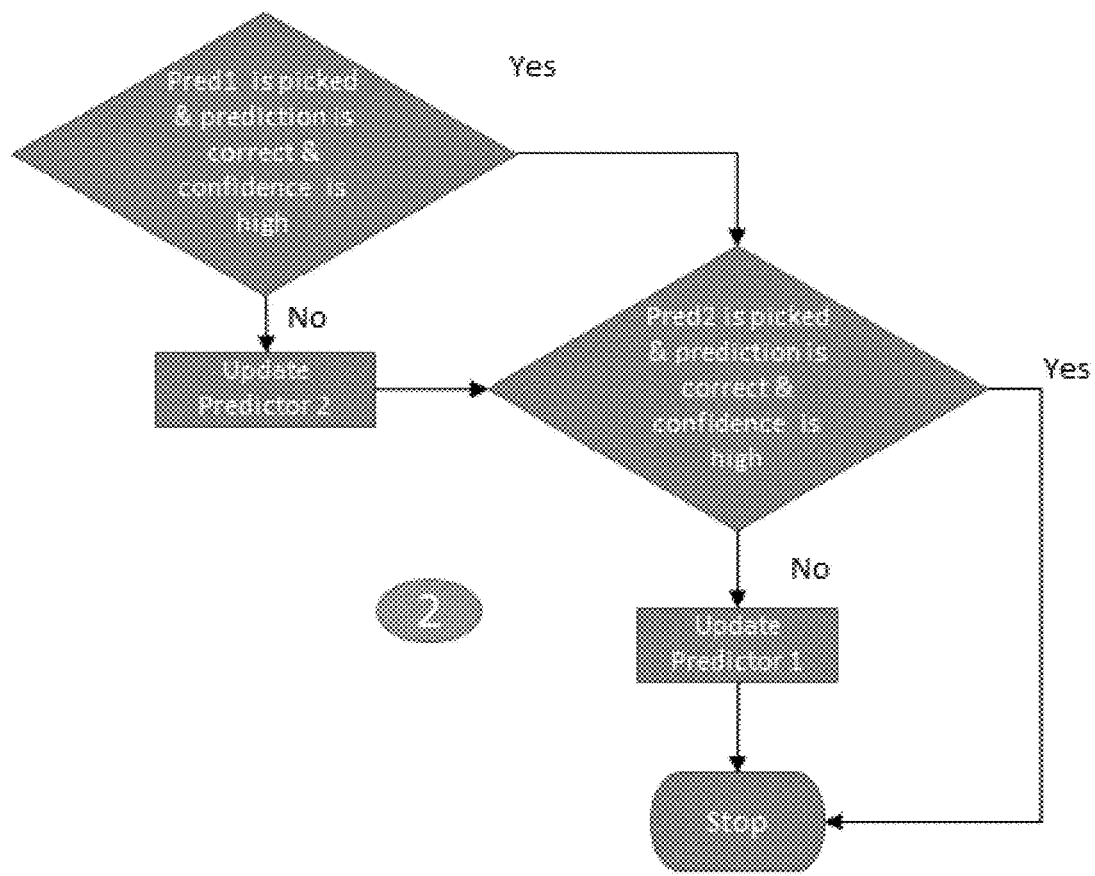
FIG. 9 illustrates an example of branch predictor selection management in a pipelined microprocessor architecture, according to embodiments.

FIG. 9 illustrates an example system 900 of branch predictor selection management in a pipelined microprocessor architecture, according to embodiments. The example system 900 may relate to updating the predictor tables. Based on the correctness/incorrectness of the predictor, selection/choice and selection confidence of the selector, the update for the predictor table may be either executed or bypassed.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A method for branch predictor selection management in a pipelined microprocessor architecture, the method comprising:
collecting, in the pipelined microprocessor architecture, a set of selection factor data;
analyzing, using a perceptron-based neural learning technique, the set of selection factor data with respect to a set of candidate branch predictors, wherein the perceptron-based neural learning technique employs a table indexed with an instruction address to calculate a vector dot product from weights and historical vector bits;
selecting, based on analyzing the set of selection factor data with respect to the set of candidate branch predictors using the perceptron-based learning technique, a chosen branch predictor from the set of candidate branch predictors, wherein the vector dot product determines the selection of the chosen branch predictor; and
invoking, in the pipelined microprocessor architecture, the chosen branch predictor.

2. The method of claim 1, further comprising:
collecting, in the pipelined microprocessor architecture, a set of historical branch behavior data;
analyzing, using the perceptron-based neural learning technique, the set of historical branch behavior data with respect to the set of candidate branch predictors; and
selecting, based on analyzing the set of historical branch behavior data with respect to the set of candidate branch predictors using the perceptron-based learning technique, the chosen branch predictor from the set of candidate branch predictors.

3. The method of claim 1, further comprising:
collecting, in the pipelined microprocessor architecture, a set of historical branch behavior data;
weighting the set of historical branch behavior data using a set of appropriate weights for the set of historical branch behavior data;
analyzing, using the perceptron-based learning technique, the set of historical branch behavior data with respect to the set of candidate branch predictors; and
selecting, using the set of historical branch behavior data with respect to the set of candidate branch predictors, the chosen branch predictor from the set of candidate branch predictors using the perceptron-based learning technique.

4. The method of claim 3, further comprising:
analyzing a weighted sum of the set of historical branch behavior data.

5. The method of claim 1, further comprising:
ascertaining a confidence derived from a set of historical branch behavior data with respect to the set of candidate branch predictors; and
selecting, based on the confidence derived from the set of historical branch behavior data with respect to the set of candidate branch predictors, the chosen branch predictor from the set of candidate branch predictors.

6. The method of claim 5, further comprising:
comparing a confidence value derived from the set of historical branch behavior data and a set of perceptron weights with a threshold value to select one among the set of candidate branch predictors;
resolving, based on the comparing, a candidate branch predictor order; and
selecting, both based on and in response to the resolving, the chosen branch predictor from the set of candidate branch predictors.

7. The method of claim 1, further comprising:
collecting, in the pipelined microprocessor architecture, a set of historical branch behavior data;
ascertaining a set of confidence weights with respect to the set of candidate branch predictors;
analyzing, using the perceptron-based learning technique, the set of historical branch behavior data with respect to the set of candidate branch predictors; and
selecting, using the set of confidence weights with respect to the set of candidate branch predictors and based on analyzing the set of historical branch behavior data with respect to the set of candidate branch predictors, the chosen branch predictor from the set of candidate branch predictors using the perceptron-based learning technique.

8. The method of claim 1, further comprising:
detecting that a first candidate branch predictor of the set of candidate branch predictors indicates a first direction of a branch;
detecting that a second candidate branch predictor of the set of candidate branch predictors indicates a second direction of the branch that differs from the first direction;
determining that the first direction is indicated to be correct and that the second direction is indicated to be incorrect; and
updating, based on determining that the first direction is indicated to be correct and that the second direction is indicated to be incorrect, the set of selection factor data.

9. The method of claim 1, further comprising:
ascertaining, based on both invoking the chosen branch predictor in the pipelined microprocessor architecture and analyzing the set of selection factor data with respect to the set of candidate branch predictors using the perceptron-based learning technique, a set of absolute confidence scores with respect to the set of candidate branch predictors;
determining, based on the set of absolute confidence scores in comparison with a threshold value with respect to the set of candidate branch predictors, to update a subset of the set of candidate branch predictors; and
updating the subset of the set of candidate branch predictors.

10. The method of claim 9, further comprising:
analyzing an absolute weighted sum of the set of selection factor data.

11. The method of claim 1, further comprising:
ascertaining, based on both invoking the chosen branch predictor in the pipelined microprocessor architecture and analyzing the set of selection factor data with respect to the set of candidate branch predictors using the perceptron-based learning technique, a set of confidence scores with respect to the set of candidate branch predictors;

determining, based on the set of confidence scores with respect to the set of candidate branch predictors, not to update a subset of the set of candidate branch predictors; and bypassing updating the subset of the set of candidate branch predictors.

12. The method of claim 1, further comprising:
determining, by comparing a threshold score with respect to a set of confidence scores, whether to update a subset of the set of candidate branch predictors.

13. The method of claim 1, further comprising:
optimizing a selector to choose an appropriate branch predictor.

14. The method of claim 1, further comprising:
identifying, using a confidence-oriented selector, the chosen branch predictor.

15. The method of claim 1, further comprising:
training, using the neural network in the pipelined microprocessor architecture, a selector.

16. The method of claim 1, further comprising:
executing, in a dynamic fashion to streamline branch predictor selection management, each of:
the collecting, the analyzing, the selecting, and the invoking.

17. The method of claim 1, further comprising:
executing, in an automated fashion without user intervention, each of:
the collecting, the analyzing, the selecting, and the invoking.

18. The method of claim 1, further comprising:
collecting, using a neural network in the pipelined microprocessor architecture, a set of historical branch behavior data;
weighting and summing the set of historical branch behavior data with a set of perceptron table weights;
analyzing, using the perceptron-based learning technique, a weighted sum of the historical branch behavior data with respect to the set of candidate branch predictors;
ascertaining a confidence score in comparison with a threshold value with respect to the set of candidate branch predictors; and
selecting the chosen branch predictor from the set of candidate branch predictors:
in response to resolving the difference in comparison between the confidence score and the threshold value with respect to the set of candidate branch predictors.

19. A system for branch predictor selection management in a pipelined microprocessor architecture, the system comprising:
a memory having a set of computer readable computer instructions,
at least one branch selector communicatively coupled to the memory and the pipelined microprocessor architecture, wherein the at least one branch selector selects a branch within a neural network in the pipelined microprocessor architecture according to the output of a processor executing the set of computer readable computer instructions; and
the processor for executing the set of computer readable instructions, the set of computer readable instructions including:
collecting, by the processor, using the neural network in the pipelined microprocessor architecture, a set of selection factor data;
analyzing, by the processor, using a perceptron-based learning technique, the set of selection factor data with respect to a set of candidate branch predictors, wherein the perceptron-based neural learning technique employs a table indexed with an instruction address to calculate a vector dot product from weights and historical vector bits;
selecting, by the processor, based on analyzing the set of selection factor data with respect to the set of candidate branch predictors using the perceptron-based learning technique, a chosen branch predictor from the set of candidate branch predictors, wherein the vector dot product determines the selection of the chosen branch predictor; and
invoking, at the at least one branch selector in the pipelined microprocessor architecture, the chosen branch predictor.

20. A computer program product for branch predictor selection management in a pipelined microprocessor architecture, the computer program product comprising a computer readable storage medium having program instructions embodied therewith, wherein the computer readable storage medium is not a transitory signal per se, the program instructions executable by a processor to cause the processor to perform a method comprising:
collecting, using a neural network in the pipelined microprocessor architecture, a set of selection factor data;
analyzing, using a perceptron-based learning technique, the set of selection factor data with respect to a set of candidate branch predictors, wherein the perceptron-based neural learning technique employs a table indexed with an instruction address to calculate a vector dot product from weights and historical vector bits;
selecting, based on analyzing the set of selection factor data with respect to the set of candidate branch predictors using the perceptron-based learning technique, a chosen branch predictor from the set of candidate branch predictors, wherein the vector dot product determines the selection of the chosen branch predictor; and
invoking, in the pipelined microprocessor architecture, the chosen branch predictor.

* * * * *